US007402101B2

(12) United States Patent
Casey

(10) Patent No.: US 7,402,101 B2
(45) Date of Patent: Jul. 22, 2008

(54) SLOT MACHINE WITH ACTIVATABLE PAY ARRANGEMENTS

(75) Inventor: Michael P. Casey, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 769 days.

(21) Appl. No.: 10/447,793

(22) Filed: May 29, 2003

(65) Prior Publication Data

US 2004/0242314 A1 Dec. 2, 2004

(51) Int. Cl.
*A63F 9/34* (2006.01)
*A63F 13/00* (2006.01)

(52) U.S. Cl. .............................. 463/20; 463/16; 463/21; 463/22; 463/25

(58) Field of Classification Search .................... 463/20
See application file for complete search history.

(56) References Cited

U.S. PATENT DOCUMENTS

| | | | | |
|---|---|---|---|---|
| 5,205,555 | A * | 4/1993 | Hamano | 273/143 R |
| 5,449,173 | A * | 9/1995 | Thomas et al. | 273/143 R |
| 5,902,184 | A | 5/1999 | Bennett | 463/13 |
| 6,056,642 | A | 5/2000 | Bennett | 463/20 |
| 6,068,552 | A | 5/2000 | Walker et al. | 463/21 |
| 6,190,254 | B1 | 2/2001 | Bennett | 463/13 |
| 6,251,013 | B1 * | 6/2001 | Bennett | 463/13 |
| 6,261,178 | B1 | 7/2001 | Bennett | 463/20 |
| 6,358,146 | B1 * | 3/2002 | Adams | 463/20 |
| 6,419,579 | B1 | 7/2002 | Bennett | 463/20 |
| 6,471,208 | B2 * | 10/2002 | Yoseloff et al. | 273/143 R |
| 6,517,432 | B1 | 2/2003 | Jaffe | 463/16 |
| 6,551,187 | B1 | 4/2003 | Jaffe | 463/20 |
| 6,612,574 | B1 * | 9/2003 | Cole et al. | 273/138.1 |
| 6,997,804 | B2 * | 2/2006 | Berman | 463/20 |
| 2002/0055382 | A1 | 5/2002 | Meyer | 463/20 |
| 2002/0082074 | A1 | 6/2002 | Bennett | 463/20 |
| 2002/0132659 | A1 * | 9/2002 | DeMar et al. | 463/16 |
| 2003/0013517 | A1 | 1/2003 | Bennett et al. | 463/25 |

(Continued)

FOREIGN PATENT DOCUMENTS

EP 1 262 929 A1 12/2002

(Continued)

OTHER PUBLICATIONS

Search Report from the United Kingdom; Patent Application No. 0409095.7, dated Sep. 21, 2004 (1 page).

*Primary Examiner*—Robert E Pezzuto
*Assistant Examiner*—Sunit Pandya
(74) *Attorney, Agent, or Firm*—Nixon Peabody LLP

(57) ABSTRACT

A method of conducting a wagering game on a gaming machine is disclosed. The wagering game includes winning symbol combinations that provide respective awards when arranged according to one or more predefined arrangements. After a player makes a wager, a plurality of symbol-bearing reels are rotated and stopped to place symbols on the reels in a symbol array. If the symbol array includes an activation symbol in a predefined location within the symbol array, the game activates an additional arrangement distinct from the predefined arrangements. The additional arrangement may, for example, be a scatter pay or a right-to-left pay along an active pay line. The game provides an award if the additional arrangement includes one of the winning symbol combinations.

26 Claims, 8 Drawing Sheets

U.S. PATENT DOCUMENTS

| | | | | |
|---|---|---|---|---|
| 2003/0013518 | A1 | 1/2003 | Graham | 463/25 |
| 2003/0125105 | A1 | 7/2003 | Bennett | 463/20 |
| 2003/0186737 | A1 | 10/2003 | Bennett et al. | 463/20 |
| 2003/0203752 | A1 | 10/2003 | Kaminkow et al. | 463/20 |
| 2003/0216165 | A1 | 11/2003 | Singer et al. | 463/20 |
| 2004/0005919 | A1 | 1/2004 | Walker et al. | 463/23 |
| 2004/0051239 | A1* | 3/2004 | Seelig et al. | 273/138.1 |
| 2004/0053676 | A1 | 3/2004 | Rodgers | 463/20 |
| 2004/0053677 | A1 | 3/2004 | Hughs-Baird | 463/20 |
| 2004/0072612 | A1 | 4/2004 | Rodgers et al. | 463/20 |
| 2005/0255903 | A1* | 11/2005 | Jackson | 463/16 |
| 2006/0068892 | A1* | 3/2006 | Gomez et al. | 463/20 |
| 2006/0189378 | A1* | 8/2006 | Aoki | 463/20 |

FOREIGN PATENT DOCUMENTS

| | | |
|---|---|---|
| GB | 2 393 018 | 3/2004 |
| GB | 2 393 019 | 3/2004 |
| WO | 97/31344 | 8/1997 |
| WO | 03/026750 A2 | 4/2003 |

* cited by examiner

FIG. 5
(Amended)
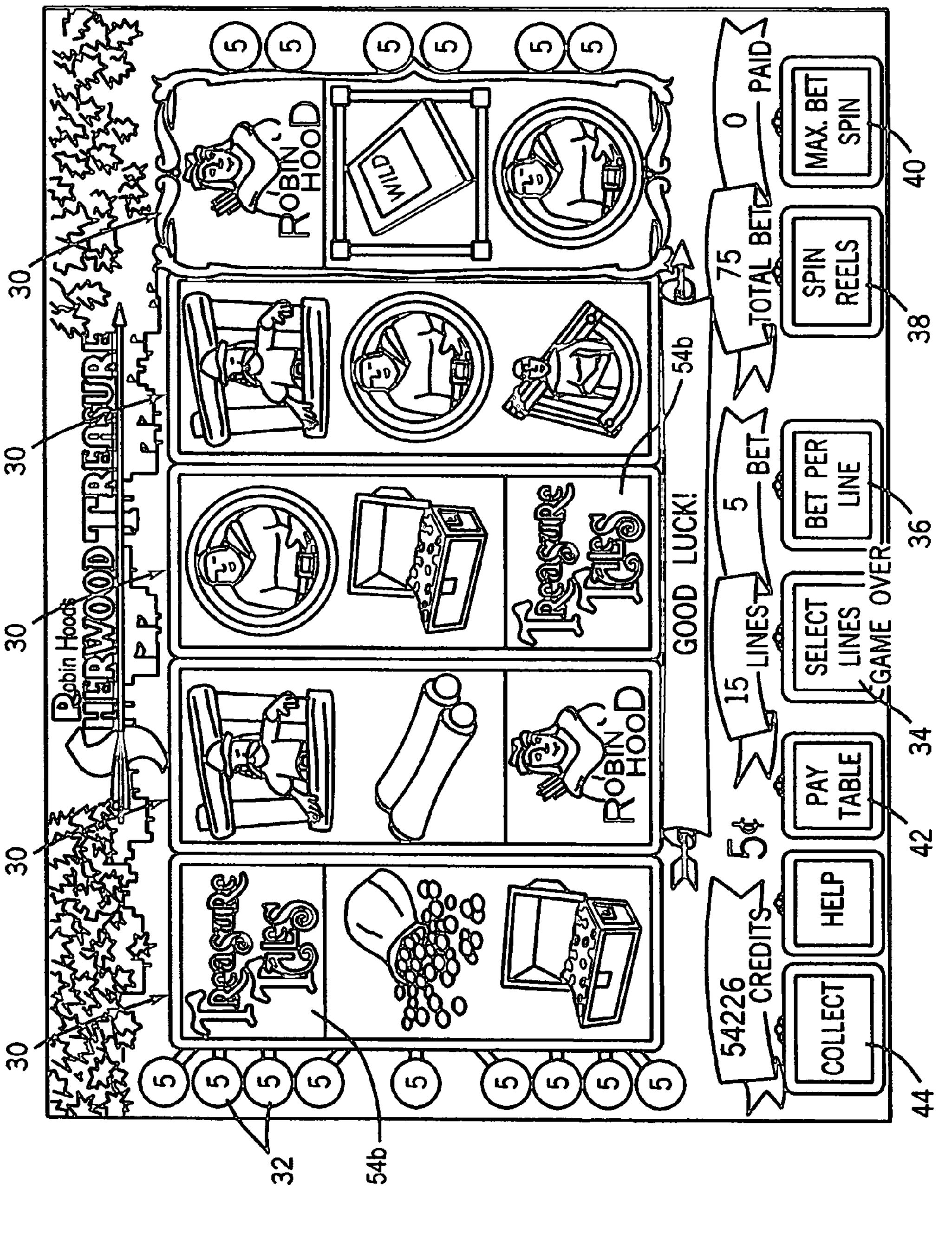

FIG. 6
(Amended)
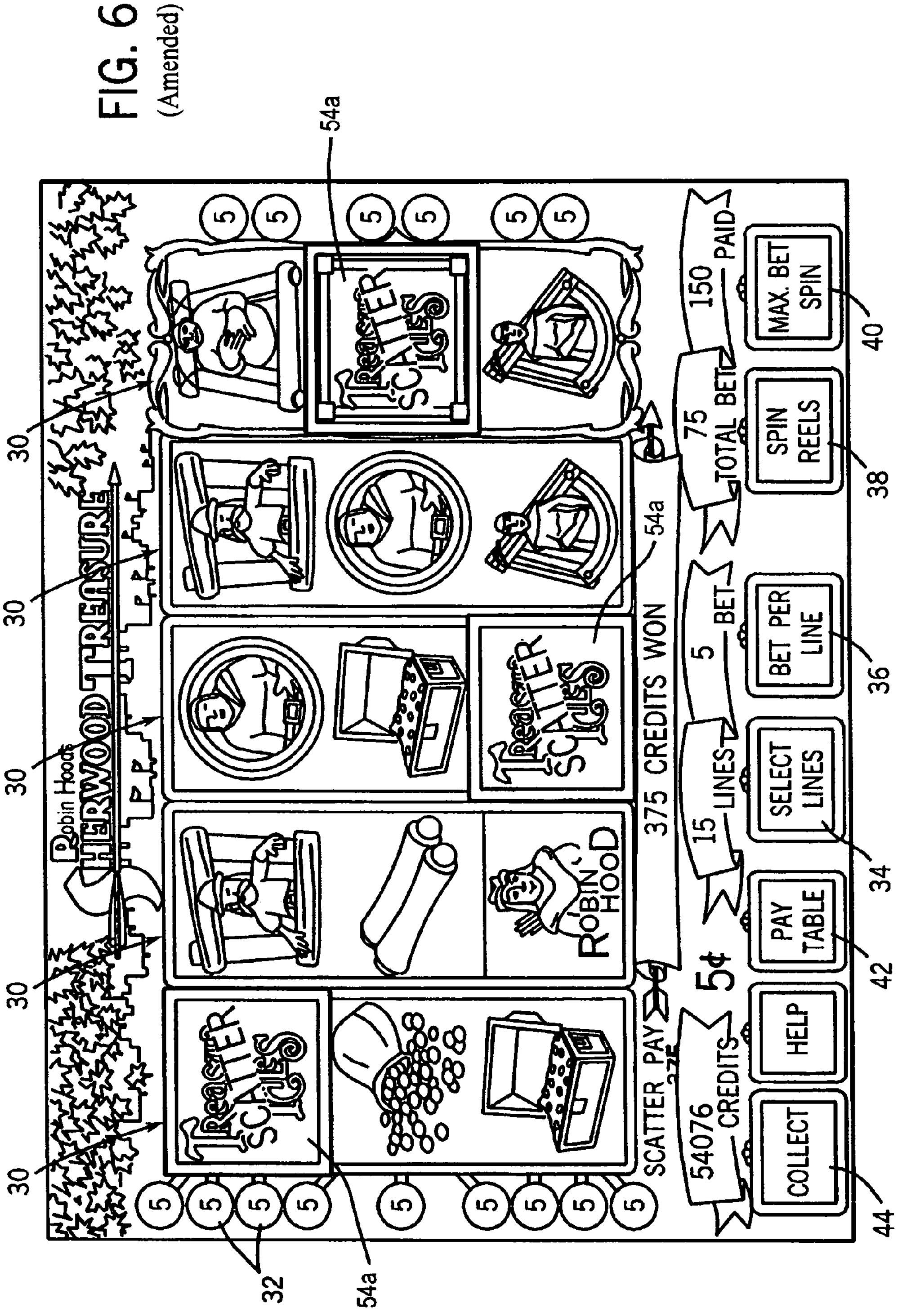

FIG. 7
(Amended)
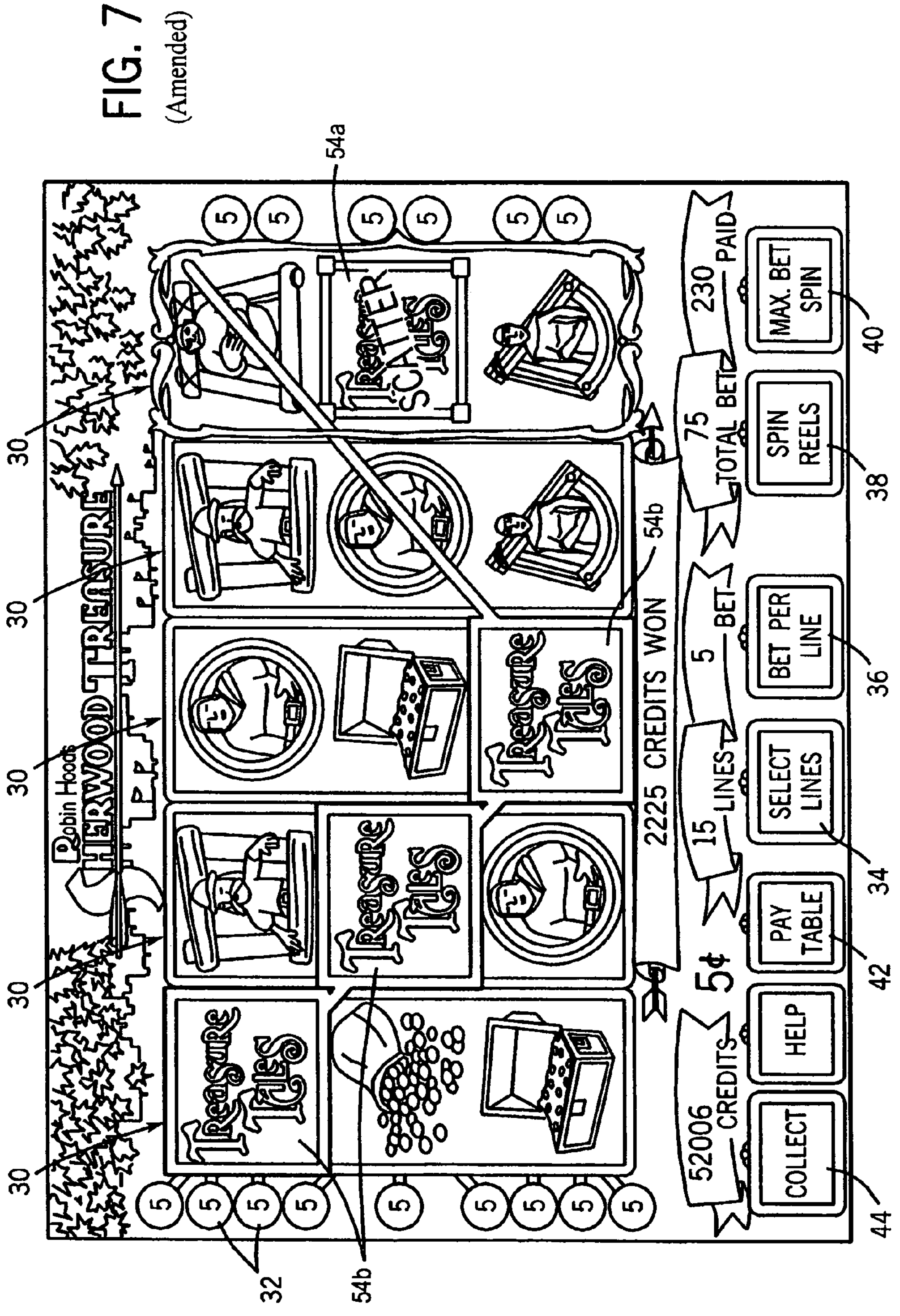

FIG. 8
(Amended)
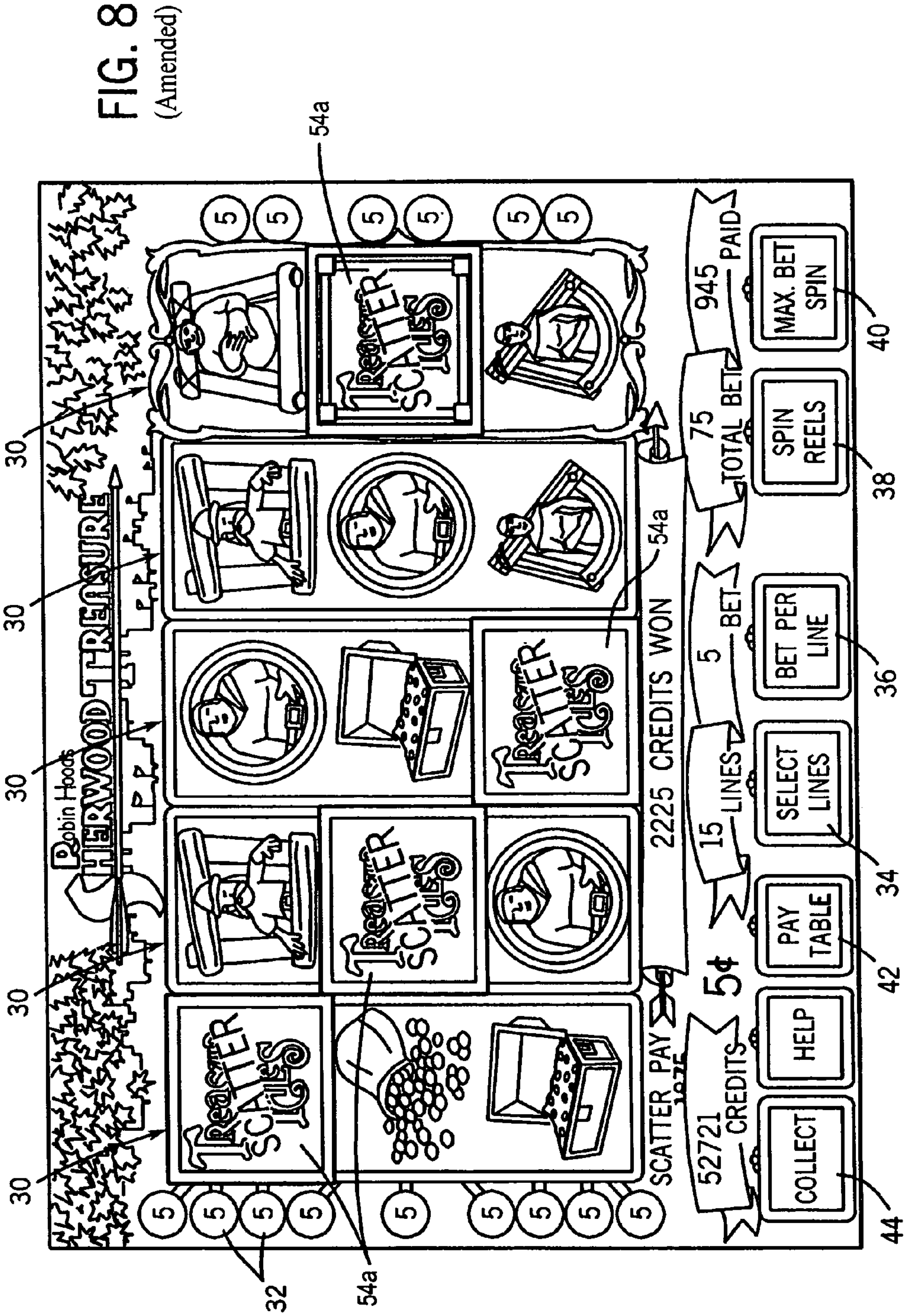

SLOT MACHINE WITH ACTIVATABLE PAY ARRANGEMENTS

FIELD OF THE INVENTION

The present invention relates generally to gaming machines and, more particularly, to a slot machine having an additional pay arrangement activated by a reel symbol.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines. Shrewd operators consequently strive to employ the most entertaining and exciting machines available because such machines attract frequent and extended play and hence increase profitability to the operator. Accordingly, in the competitive gaming machine industry, there is a continuing need for gaming machine manufacturers to produce new types of games, or enhancements to existing games, which will attract frequent and extended play by enhancing the entertainment value and excitement associated with the game.

SUMMARY OF THE INVENTION

A method of conducting a wagering game on a gaming machine is disclosed. The wagering game includes winning symbol combinations that provide respective awards when arranged according to one or more predefined arrangements. After a player makes a wager, a plurality of symbol-bearing reels are rotated and stopped to place symbols on the reels in a symbol array. If the symbol array includes an activation symbol in a predefined location within the symbol array, the game activates an additional arrangement distinct from the predefined arrangements. The additional arrangement may, for example, be a scatter pay or a right-to-left pay along an active pay line. The game provides an award if the additional arrangement includes one of the winning symbol combinations.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

The foregoing and other advantages of the invention will become apparent upon reading the following detailed description and upon reference to the drawings in which:

FIG. 5 is a display image associated with the basic slot game, where a scatter pay activation symbol does not appear on the rightmost reel;

FIG. 6 is a display image associated with the basic slot game, where a scatter pay activation symbol appears on the rightmost reel and activates a scatter pay for that symbol; and FIGS. 7 and 8 are display images associated with the basic slot game, where a scatter pay activation symbol appears on the rightmost reel and the game awards both a left-to-right line pay (FIG. 7) and an activated scatter pay (FIG. 8) for that symbol.

Figure 1:
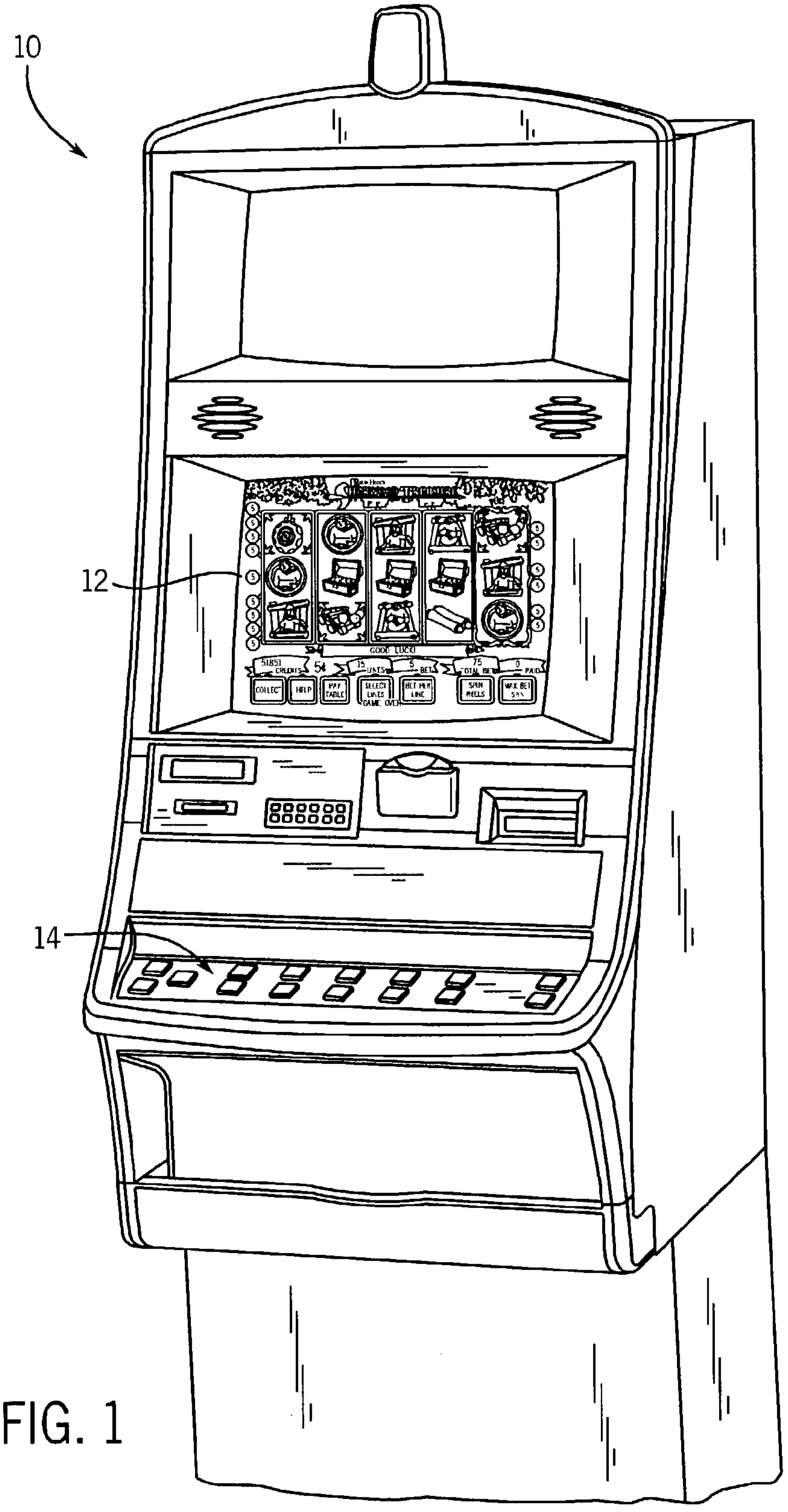
FIG. 1 is a perspective view of a gaming machine embodying the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF SPECIFIC EMBODIMENTS

Turning now to the drawings and referring initially to FIG. 1, a gaming machine 10 is operable to play a wagering game. The wagering game includes a basic video reel slot game where a rightmost (fifth) reel is called the "Treasure Reel." There are bonus events that are only triggered by symbols on this reel. The bonus events include, among other things, (i) a right-to-left activation symbol for activating right-to-left line pays and (ii) a scatter pay activation symbol for activating a scatter pay.

The gaming machine 10 includes a visual display 12 preferably in the form of a cathode ray tube (CRT), liquid crystal display (LCD), plasma, or other type of video display known in the art. The display 12 is preferably outfitted with a touch screen. In the illustrated embodiment, the gaming machine 10 is an "upright" version in which the display 12 is oriented vertically relative to the player. Alternatively, the gaming machine may be a "slant-top" version in which the display 12 is slanted at about a thirty-degree angle toward the player of the gaming machine 10.

Figure 2:
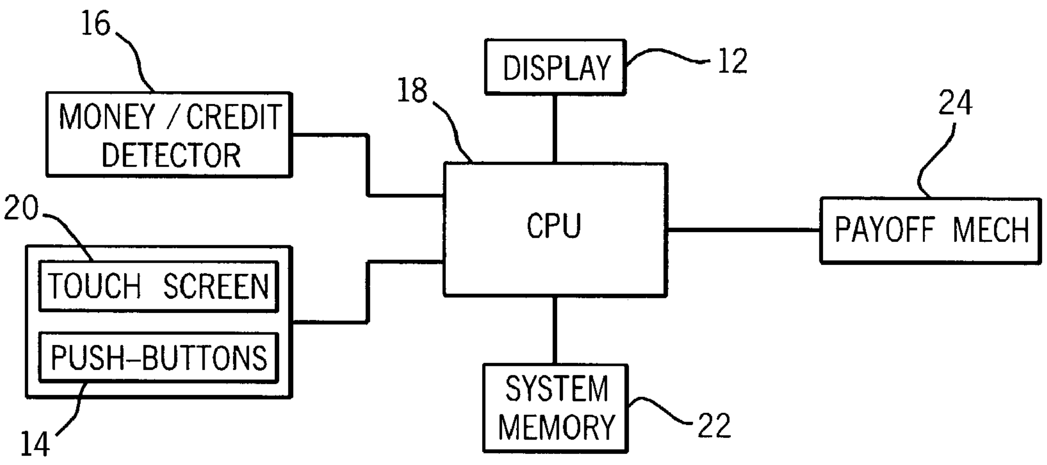
FIG. 2 is a block diagram of a control system suitable for operating the gaming machine.

FIG. 2 is a block diagram of a control system suitable for operating the gaming machine 10. Money/credit detector 16 signals a central processing unit ("CPU") 18 when a player has inserted money or played a number of credits. The money may be provided by coins, bills, tickets, coupons, cards, etc. Then, the CPU 18 operates to execute a game program that causes the display 12 to display five simulated symbol-bearing reels. The player may select a number of pay lines to play, an amount to wager, and start game play via the touch screen 20 or the push-buttons 14, causing the CPU 18 to set the reels in motion, randomly select a game outcome, and then stop the reels to display symbols corresponding to the pre-selected game outcome. In accordance with the present invention, certain activation symbols appearing on the Treasure Reel can activate certain additional pay arrangements that cannot be directly activated by the player through his or her wager and pay line selections.

A system memory 22 stores control software, operational instructions and data associated with the gaming machine 10. In one embodiment, the system memory 22 comprises a separate read-only memory (ROM) and battery-backed random-access memory (RAM). However, it will be appreciated that the system memory 22 may be implemented on any of several alternative types of memory structures or may be implemented on a single memory structure. A payoff mechanism 24 is operable in response to instructions from the CPU 18 to award a payoff to the player in response to certain winning outcomes that might occur in the basic game or the bonus events. The payoff may be provided in the form of coins, bills, tickets, coupons, cards, etc. The payoff amounts are determined by one or more pay tables stored in the system memory 22.

Figure 3:
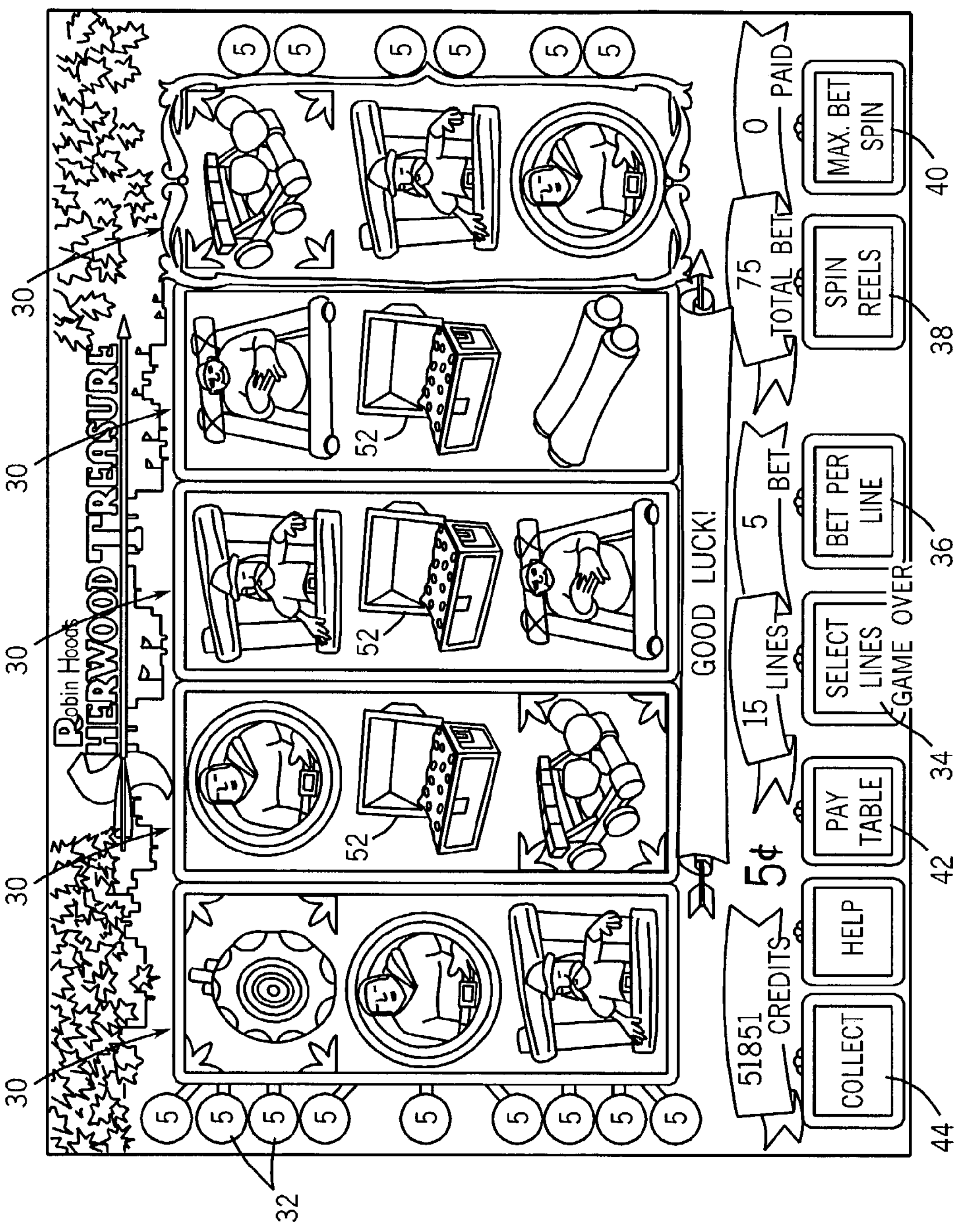
FIG. 3 is a display image associated with a basic slot game, where a right-to-left activation symbol does not appear on the rightmost reel.

Referring to FIG. 3, a basic video slot game is implemented on the display 12 on simulated reels 30 that are rotated and stopped to place symbols on the reels 30 in visual association with a number of pay lines 32. In the illustrated example, the number of reels 30 is five and the number of pay lines 32 is fifteen. The number of reels 30 and pay lines 32 may, however, be varied to be more or less than the number illustrated. Also, the video display 12 may be replaced with a mechanical display including a number of physical reels driven by stepper motors. Each of the pay lines 32 extends through one symbol on each of the reels 30.

Generally, game play is initiated by inserting money or playing a number of credits, causing the CPU to activate a number of pay lines 32 corresponding to the amount of money or number of credits played. In one embodiment, the player selects the number of pay lines 32 (between one and fifteen) to play by pressing a "Select Lines" key 34. The player then chooses the number of coins or credits to wager on the selected pay lines 32 by pressing a "Bet Per Line" key 36. After selecting a number of pay lines 32 and a wager amount, the reels 30 may be set in motion by touching a "Spin Reels" key 38 or, if the player wishes to bet the maximum amount per line, by using a "Max Bet Spin" key 40. Alternatively, other mechanisms such as a lever or push button may be used to set the reels 30 in motion.

The CPU uses a random number generator to select a game outcome (e.g., "basic" game outcome) corresponding to a particular set of reel "stop positions." The CPU then causes each of the video reels 30 to stop at the appropriate stop position. Video symbols are displayed on the reels 30 to graphically illustrate the reel stop positions and indicate whether the stop positions of the reels represent a winning game outcome.

A pay table identifies winning basic game outcomes (e.g., symbol combinations resulting in an award of credits) and the awards associated with such outcomes. In one embodiment, the pay table is affixed to the machine 10 and/or displayed by the video display 12 in response to a command by the player (e.g., by pressing a "Pay Table" button 42). A winning basic game outcome occurs when the symbols appearing on the stopped reels 30 in an active pay arrangement (e.g., active pay line or active scatter pay) correspond to one of the winning combinations on the pay table. In the illustrated example, winning combinations normally pay only left to right and only along player-activated pay lines 32, i.e., a winning combination must appear along an active pay line 32, starting from the leftmost reel and spanning adjacent reels 30. A player activates a pay line 32 for left-to-right pays by selecting and wagering on that pay line prior to spinning the reels 30.

A winning combination may, for example, be three or more matching symbols appearing left to right, adjacent to each other, and along an active pay line 32, where the award is greater as the number of matching symbols along the active pay line 32 increases. If the displayed symbols stop in such a winning combination, the game provides the award identified in the pay table for that combination. If the award is a number of credits, the game typically multiplies that number of credits by the number of credits wagered on the winning active pay line 32. The player may collect the amount of accumulated credits by pressing a "Collect" button 44. In the illustrated example, relevant portions of the pay table screens and instructional text appear below:

Winning line pay combinations pay left to right, except when [RTLWILD] is present. Winning combinations formed by [RTLWILD] pay right to left. [RTLWILD] substitutes for all symbols except [CATAPULT,] [TARGET,] [SCROLL,] [LOGOSCAT,] [BAGSCAT,] and [BOOKWILD.]

[BOOKWILD] substitutes for all symbols except [CATAPULT,] [TARGET,] [SCROLL,] [LOGOSCAT,] [BAGSCAT,] and [RTLWILD.]

| | | | |
|---|---|---|---|
| [LOGO] | | [ROBIN] | |
| 5000 | [S][S][S][S][S] | 700 | [S][S][S][S][S] |
| 750 | [S][S][S][S] | 200 | [S][S][S][S] |
| 50 | [S][S][S] | 30 | [S][S][S] |
| 10 | [S][S] | 7 | [S][S] |
| [TUCK] | | [SCARLET] | |
| 500 | [S][S][S][S][S] | 200 | [S][S][S][S][S] |
| 150 | [S][S][S][S] | 70 | [S][S][S][S] |
| 25 | [S][S][S] | 20 | [S][S][S] |
| 5 | [S][S] | | |
| [JOHN] | | [FINNY] | |
| 150 | [S][S][S][S][S] | 100 | [S][S][S][S][S] |
| 50 | [S][S][S][S] | 40 | [S][S][S][S] |
| 10 | [S][S][S] | 5 | [S][S][S] |
| [CHEST] | | [BAG] | |
| 100 | [S][S][S][S][S] | 100 | [S][S][S][S][S] |
| 30 | [S][S][S][S] | 20 | [S][S][S][S] |
| 5 | [S][S][S] | 5 | [S][S][S] |
| [BAG] | | | |
| 100 | [S][S][S][S][S] | | |
| 20 | [S][S][S][S] | | |
| 5 | [S][S][S] | | |

Only highest winner paid per winning combination. All line pays are multiplied by the line bet. Wins from the left must occur on adjacent reels, beginning with the leftmost reel. Wins from the right must occur on adjacent reels, beginning with the rightmost reel.

Logo Scatter Pay:

-continued

[LOGOSCAT] substitutes for [LOGO]. When [LOGOSCAT] is present on the rightmost reel, [LOGO] pays scattered.
[LOGO]

| | |
|---|---|
| 250 | [S][S][S][S][S] |
| 25 | [S][S][S][S] |
| 5 | [S][S][S] |
| 1 | [S][S] |

Only highest winner paid per winning combination during Logo Scatter Pays.
All Logo Scatter Pay awards are multiplied by the total bet.
Bag Scatter Pay:
[BAGSCAT] substitutes for [BAG]. When [BAGSCAT] is present on the rightmost reel, [BAG] pays scattered.
[BAG]

| | |
|---|---|
| 10 | [S][S][S][S][S] |
| 3 | [S][S][S][S] |
| 1 | [S][S][S] |

Only highest winner paid per winning combination during Bag Scatter Pays.
All Bag Scatter Pay awards are multiplied by the total bet.
Scroll Bonus:
3 [SCROLL] scattered on reels 2, 3, and 4 trigger the Scroll Bonus.
. . .
Siege Bonus:
Winning combinations of 3 or more [CATAPULT] on an active payline trigger the Siege Bonus. The Siege Bonus can also be triggered in the Scroll Bonus.
. . .
Archery Bonus:
Winning combinations of 3 or more [TARGET] on an active payline trigger the Archery Bonus. The Archery Bonus can also be triggered in the Scroll Bonus.
. . .

Included among the plurality of basic game outcomes are start-feature outcomes for triggering play of different bonus events such as those referenced in the above pay table screens. A start-feature outcome may be defined in any number of ways. For example, a start-feature outcome may occur when a special start-feature symbol or a special combination of symbols appears on one or more of the reels 30. The start-feature outcome may require the combination of symbols to appear along an active pay line 32, or may alternatively require that the combination of symbols appear anywhere on the display (i.e., "scattered") regardless of whether the symbols are along an active pay line 32. The appearance of a start-feature outcome causes the CPU to shift operation from the basic game to the associated bonus event. In the illustrated example, the fifth, or rightmost, reel is called the Treasure Reel. There are bonus events that are only triggered by symbols on this reel. The bonus events include, among other things, (i) a right-to-left activation symbol for activating right-to-left line pays and (ii) a scatter pay activation symbol for activating a scatter pay.

Figure 4:
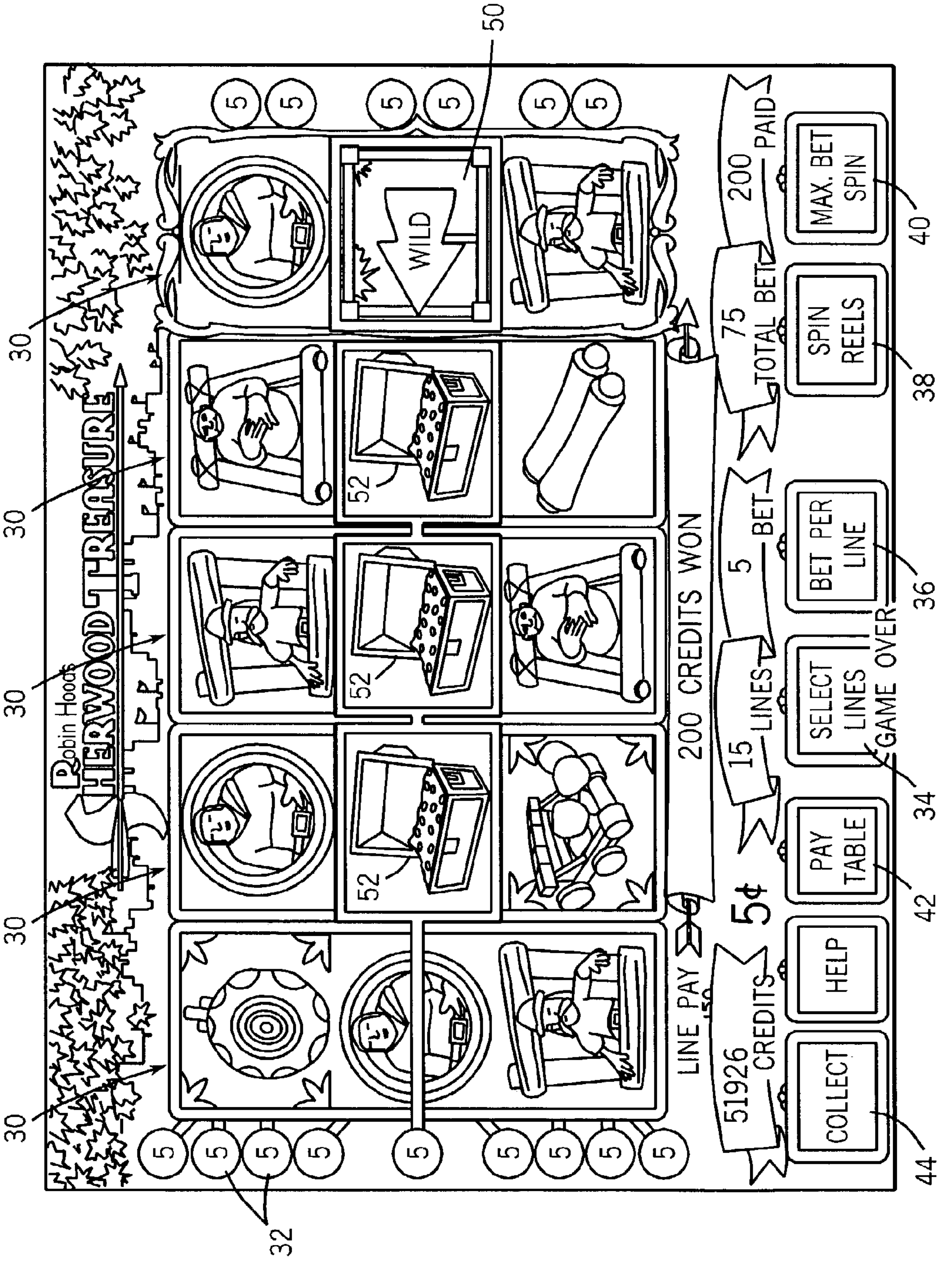
FIG. 4 is a display image associated with the basic slot game, where a right-to-left activation symbol appears on the rightmost reel and activates right-to-left pays along active pay lines passing through that symbol.

Referring to FIGS. 3 and 4, if a Right-to-Left Wild symbol 50 (called [RTLWILD] in the above pay table) stops anywhere on the Treasure Reel, the player will be paid for any winning combinations formed from right to left along active pay lines 32 that pass through the Right-to-Left Wild symbol 50. The Right-to-Left Wild symbol 50 is wild for all symbols except other bonus-triggering symbols. The bonus-triggering symbols include a Catapult symbol, a Target symbol, and a Scroll symbol. In the right-to-left pay, a winning combination must appear along an active pay line 32 (passing through the Right-to-Left Wild symbol 50), starting from the Treasure Reel and spanning adjacent reels 30.

The reel spin in FIG. 3 results in no winning combinations. FIG. 4 depicts the same reel spin except that the Right-to-Left Wild symbol 50 has stopped on the Treasure Reel. Because the Right-to-Left Wild symbol 50 appears on the same active pay line 32 as the three adjacent Chest symbols 52 and is wild for the Chest symbol 52, the player is paid for a winning combination of four Chest symbols 52. According to the pay table, a combination of four Chest symbols 52 along an active pay line 32 yields an award of 30 credits multiplied by the number of credits wagered on the active pay line 32.

Referring to FIGS. 5 and 6, if a Logo Scatter symbol 54*a* (called [LOGOSCAT] in the above pay table) stops anywhere on the Treasure Reel, the Logo Scatter symbol 54*a* substitutes for the Logo symbol 54*b* and activates a scatter pay for the Logo symbol 54*b* (called [LOGO] in the above pay table). In addition to the scatter pay, the player will still be paid for any left-to-right line pays with or without the Logo symbol 54*b*. A scatter pay requires that the winning combination of symbols appear anywhere on the display regardless of whether the symbols are along an active pay line 32. According to the pay table, at least two scattered Logo symbols 54*b* are required to form a winning scatter combination. Therefore, if the Logo Scatter symbol 54*a* stops on the Treasure Reel and one or more Logo symbols 54*b* stop scattered on the first, second, third, or fourth reel, the player is paid a scatter pay for that combination.

The reel spin in FIG. 5 results in no winning combination for the Logo symbols 54*b* because (i) such symbols are not arranged in a left-to-right line pay and (ii) such symbols do not pay as a scatter pay because the Logo Scatter symbol 54*a* does not appear on the Treasure Reel. FIG. 6 depicts the same reel spin except that the Logo Scatter symbol 54*a* has stopped on the Treasure Reel. When the Logo Scatter symbol 54*a* appears on the Treasure Reel, the Logo Scatter symbol 54*a* substitutes for the Logo symbol 54*b* and the Logo symbol 54*b* pays scattered. The term "scatter" appears superimposed on the Logo Scatter symbol 54*a* to indicate that it pays scattered. Because there are two other Logo symbols 54*b* on the first four reels, there are a total of three Logo symbols 54*b* in the scatter combination. According to the pay table, a winning combination of three scattered Logo symbols 54*b* yields an award of 5 credits multiplied by the total number of credits wagered. All scatter pays are multiplied by the total bet, not the line bet.

As noted above, scatter pays are in addition to any left-to-right line pays. FIGS. 7 and 8 depict both a left-to-right line pay (FIG. 7) and a scatter pay (FIG. 8) resulting from the same spin of the reels 30. Referring to FIG. 7, the left-to-right line pay includes a combination of three Logo symbols 54*b* along an active pay line 32 that passes through the top position of the first reel, the middle position of the second reel, the bottom position of the third reel, the middle position of the fourth reel, and the top position of the Treasure Reel. According to the pay table, a winning combination of three Logo symbols 54*b* along an active pay line 32 yields an award of 50 credits multiplied by the number of credits wagered on the active pay line 32. The Logo Scatter symbol 54*a* on the Treasure Reel does not appear along this pay line 32 and therefore is not part of the left-to-right line pay.

The Logo Scatter symbol 54*a* on the Treasure Reel is, however, part of the scatter pay in FIG. 8. Referring to FIG. 8, the scatter pay includes a combination of four Logo symbols 54*b*, where the Logo Scatter symbol 54*a* on the Treasure Reel substitutes for the Logo symbol 54*b*. According to the pay table, a winning combination of four scattered Logo symbols 54*b* yields an award of 25 credits multiplied by the total number of credits wagered. All scatter pays are multiplied by the total bet, not the line bet.

In the above-described video slot game, the Logo Scatter symbol 54*a* on the Treasure Reel activates a scatter pay for the Logo symbol 54*b* (i.e., when the Logo Scatter symbol 54*a* appears on the Treasure Reel, the Logo symbol 54*b* pays scattered). Similarly, as noted in the pay table, a Bag Scatter symbol on the Treasure Reel activates a scatter pay for the Bag symbol. It suffices to state that the scatter pay for the Bag symbol operates like the scatter pay for the Logo symbol 54*b*.

While the present invention has been described with reference to one or more particular embodiments, those skilled in the art will recognize that many changes may be made thereto without departing from the spirit and scope of the present invention.

For example, the predefined location that must contain an activation symbol in order to activate an additional pay arrangement (e.g., right-to-left line pay, scatter pay, etc.) need not be limited to the fifth reel (Treasure Reel). The location could be a different reel, a combination of reels, any reel, a particular position on a particular reel (e.g., middle position), a particular position on a combination of reels, a particular position on any reel, etc.

The additional pay arrangements activated by an activation symbol may be varied. In the illustrated example, a Right-to-Left Wild symbol 50 on the Treasure Reel activates right-to-left pays along active pay lines 32 that pass through the Right-to-Left Wild symbol 50. Alternatively, the Right-to-Left Wild symbol 50 may activate all right-to-left line pays, whether or not a pay line 32 passes through the Right-to-Left Wild symbol 50. In the illustrated example, a Logo Scatter symbol 54*a* on the Treasure Reel activates scatter pays for the Logo symbol 54*b*. Alternatively, the Logo Scatter symbol 54*a* may activate scatter pays for any symbol, not just the Logo symbol 54*b*. In other alternative embodiments, the activation symbol may activate other unusual pay arrangements, such as four corners of the symbol array and pay lines other than those that can be purchased by a player with his or her wager.

In addition to activating additional pay arrangements, an activation symbol could de-activate other pay arrangements. For example, when the Right-to-Left Wild symbol 50 activates right-to-left line pays, it could de-activate left-to-right pays. Similarly, when the Logo Scatter symbol 54*a* activates a scatter pay for the Logo symbol 54*b*, it could de-activate line pays for that symbol.

The function of the activation symbol can be varied. In the illustrated example, the Right-to-Left Wild symbol 50 is wild for all symbols except other bonus-triggering symbols. Alternatively, the symbol for activating right-to-left line pays need not be wild and could be one of the other reel symbols in the video slot game.

Each of these embodiments and obvious variations thereof is contemplated as falling within the spirit and scope of the claimed invention, which is set forth in the following claims.

What is claimed is:

1. A method of conducting a wagering game, the wagering game providing a winning outcome when at least one of a plurality of predefined symbol combinations occurs in at least one of a plurality of specified symbol arrangements, the method comprising:

receiving a wager to play the wagering game;

displaying a symbol array formed from symbols randomly selected from a plurality of possible symbols, the plurality of possible symbols including an activation symbol;

determining if the symbol array has a first winning outcome, the first winning outcome having at least one of the plurality of predefined symbol combinations in a first symbol arrangement;

providing an award for any first winning outcome;

determining if the symbol array includes the activation symbol, the activation symbol for specifying a second symbol arrangement different than the first symbol arrangement;

evaluating the same symbol array for a second winning outcome, the second winning outcome having at least one of the plurality of predefined symbol combinations in the second symbol arrangement; and providing an award for any second winning outcome, wherein the activation symbol defines the second symbol arrangement required for the second winning outcome, and wherein the activation symbol only defines the second symbol arrangement when the activation symbol is disposed in a predefined location in the symbol array.

2. The method of claim 1, wherein the activation symbol defines at least one of a plurality of symbol arrangements required for the second winning outcome.

3. The method of claim 1, wherein the activation symbol comprises a single symbol selected from the plurality of symbols.

4. The method of claim 1, wherein the second symbol arrangement is a scatter pay formed from winning symbol combinations anywhere in the symbol array.

5. The method of claim 4, wherein the activation symbol specifies at least one symbol selected from the plurality of symbols for which the scatter pay is effective.

6. The method of claim 4, wherein the predefined location is selected from a predefined subset of symbol positions in the symbol array.

7. The method of claim 1, wherein the activation symbol only defines the second symbol arrangement required for the second winning outcome when the activation symbol occupies one or more predetermined symbol positions within the symbol array, and wherein the second symbol arrangement comprises symbols that are the same as the activation symbol.

8. The method of claim 1, wherein the displaying step includes rotating and stopping a plurality of symbol bearing reels.

9. The method of claim 1, wherein the predefined location is selected from a predefined subset of symbol positions in the symbol array.

10. The method of claim 9, wherein the predefined subset of symbol positions in the symbol array location is a predefined column of the symbol array.

11. A method of conducting a wagering game, the wagering game providing a winning outcome when at least one of a plurality of predefined symbol combinations occurs in at least one of a plurality of specified symbol arrangements, the method comprising:

receiving a wager to play the wagering game;

displaying a symbol array formed from a randomly selected plurality of symbols;

determining if the symbol array has a first winning outcome, the first winning outcome having at least one of the plurality of predefined symbol combinations in a first symbol arrangement;

providing an award for any first winning outcome;

determining if the symbol array includes an activation symbol, the activation symbol for specifying a second symbol arrangement different than the first symbol arrangement;

evaluating the same symbol array for a second winning outcome, the second winning outcome having at least one of the plurality of predefined symbol combinations in the second symbol arrangement; and providing an award for any second winning outcome, wherein the activation symbol defines the second symbol arrangement required for the second winning outcome, wherein the first symbol arrangement is a left-to-right pay staffing from a leftmost column of the symbol array, and wherein the second symbol arrangement is a right-to-left pay starting from a rightmost column of the symbol array, and wherein the activation symbol only defines the second symbol arrangement when the activation symbol is disposed in a predefined location in the symbol array.

12. A method of conducting a wagering game, the wagering game including a plurality of predefined symbol arrangements for yielding an award when one of the plurality of predefined symbol arrangements includes at least one winning symbol combination, the method comprising:

receiving a wager to play the wagering game;

displaying the symbol array formed from symbols randomly selected from a plurality of possible symbols, the plurality of possible symbols including an activation symbol;

determining if the symbol array has a first winning outcome, the first winning outcome having the winning symbol combination in a first predefined symbol arrangement;

providing an award for any first winning outcome;

determining if the same symbol array has a second winning outcome, the second winning outcome having the winning symbol combination in a second predefined symbol arrangement different than the first symbol arrangement, the second predefined symbol arrangement being defined by the activation symbol in the symbol array; and providing an award for any second winning outcome, wherein the activation symbol only defines the second predefined symbol arrangement when the activation symbol is disposed in a predefined location in the symbol array.

13. The method of claim 12, wherein the activation symbol defines a single symbol arrangement required for the second winning outcome.

14. The method of claim 12, wherein the activation symbol defines at least one of the plurality of symbol arrangements required for the second winning outcome.

15. The method of claim 12, wherein a plurality of activation symbols are provided, and wherein the activation symbol is selected from the plurality of activation symbols.

16. The method of claim 12, wherein the second predefined symbol arrangement is a scatter pay formed from winning symbol combinations anywhere in the symbol array.

17. The method of claim 12, wherein the displaying step includes displaying the activation symbol in a symbol array.

18. The method of claim 12, wherein the predefined location is in a rightmost column of the symbol array.

19. The method of claim 18, wherein the winning outcome formed from the winning symbol combination and the symbol arrangement defined by the activation symbol must be on an active pay line through the activation symbol array position.

20. The method of claim 12, further including rotating and stopping a plurality of symbol-bearing reels to place symbols on the reels in the symbol array.

21. The method of claim 12, wherein the symbol array has both the activation symbol and another symbol in the same array position.

22. A method of conducting a wagering game, the wagering game including a plurality of predefined symbol arrangements for yielding a winning outcome when one of the plurality of predefined symbol arrangements includes one of a plurality of winning symbol combinations, the method comprising:

receiving a wager to play the wagering game;

displaying a symbol array formed from symbols randomly selected from a plurality of possible symbols, the plurality of possible symbols including an activation symbol, the symbol array comprising at least one activation symbol selected from a plurality of activation symbols, the activation symbol for defining a second symbol arrangement within the symbol array;

determining if the symbol array has a winning outcome in a first symbol arrangement, the winning outcome having at least one of the plurality of winning symbol combinations in at least one of the predefined symbol arrangements;

determining if the same symbol array has a winning outcome in the second symbol arrangement, and providing an award for any winning outcome, wherein the activation symbol only defines the second symbol arrangement when the activation symbol is disposed in a predefined location in the symbol array.

23. The method of claim 22, wherein the activation symbol defines at least one of a plurality of symbol arrangements.

24. The method of claim 23, wherein the at least one activation symbol and one of the plurality of symbols occupy the same array position.

25. The method of claim 22, wherein the winning outcome formed from the at least one winning symbol combination and the at least one predefined symbol arrangement defined by the activation symbol must be on an active pay line associated with the activation symbol.

26. The method of claim 22, wherein the predefined location is selected from a predefined subset of symbol positions in the symbol array.

* * * * *

UNITED STATES PATENT AND TRADEMARK OFFICE

CERTIFICATE OF CORRECTION

PATENT NO. : 7,402,101 B2
APPLICATION NO. : 10/447793
DATED : July 22, 2008
INVENTOR(S) : Michael P. Casey It is certified that error appears in the above-identified patent and that said Letters Patent is hereby corrected as shown below:

Error In Patent Application File
Claim 11,
Col. 9, Line 29 Change the term "staffing" in claim 11 to read -starting-.

Signed and Sealed this

Twenty-seventh Day of January, 2009

JOHN DOLL
*Acting Director of the United States Patent and Trademark Office*